United States Patent
Baerg

(10) Patent No.: US 7,828,553 B2
(45) Date of Patent: Nov. 9, 2010

(54) MATHEMATICS TEACHING AID

(76) Inventor: Carla Baerg, 3921 Springland La., Bellingham, WA (US) 98226

( * ) Notice: Subject to any disclaimer, the term of this patent is extended or adjusted under 35 U.S.C. 154(b) by 462 days.

(21) Appl. No.: 11/860,054

(22) Filed: Sep. 24, 2007

(65) Prior Publication Data

US 2009/0081625 A1 Mar. 26, 2009

Related U.S. Application Data

(60) Provisional application No. 60/957,953, filed on Aug. 24, 2007.

(51) Int. Cl.
G09B 19/02 (2006.01)
(52) U.S. Cl. .................................... 434/203
(58) Field of Classification Search ................ 434/188, 434/191, 195, 196, 203, 204, 206, 207, 208
See application file for complete search history.

(56) References Cited

U.S. PATENT DOCUMENTS

| | | | |
|---|---|---|---|
| 189,979 A | 4/1877 | Wieser | |
| 378,866 A * | 3/1888 | Clark | 434/203 |
| 422,612 A | 3/1890 | Neuhaus | |
| 1,372,087 A | 3/1921 | Roddy | |
| 1,568,576 A | 1/1926 | Stout | |
| 1,694,405 A | 12/1928 | Troidl | |
| 3,229,388 A | 1/1966 | Smith | |
| 3,743,750 A | 7/1973 | Hurue | |
| 3,808,708 A | 5/1974 | Huskin | |
| 4,096,644 A | 6/1978 | Nesher et al. | |
| 4,176,472 A | 12/1979 | Devanney | |
| 4,295,832 A | 10/1981 | Karell | |
| 4,333,757 A * | 6/1982 | Kurtzman, Jr. | 71/5 |
| 4,560,354 A | 12/1985 | Fowler | |
| 4,993,952 A | 2/1991 | Yeh | |
| 5,149,269 A | 9/1992 | Ylitalo | |
| RE34,498 E | 1/1994 | Ylitalo | |
| 5,334,026 A | 8/1994 | Ylitalo | |
| 5,423,682 A * | 6/1995 | Hildebrandt | 434/195 |
| 5,769,639 A * | 6/1998 | Foster | 434/159 |
| 6,171,111 B1 | 1/2001 | Buckner | |
| 6,375,468 B1 * | 4/2002 | Sundararajan | 434/203 |
| 6,676,415 B2 * | 1/2004 | Walker et al. | 434/203 |
| 6,729,883 B1 | 5/2004 | Raiche | |
| 6,758,675 B2 | 7/2004 | Karabaic | |
| 6,884,077 B2 | 4/2005 | Faulkner | |
| 7,077,655 B2 * | 7/2006 | Watanabe | 434/203 |
| 7,104,799 B1 * | 9/2006 | Sansing | 434/195 |
| 7,300,286 B2 * | 11/2007 | Palang | 434/203 |
| 7,534,106 B1 * | 5/2009 | Dutcher et al. | 434/188 |

* cited by examiner

*Primary Examiner*—Kurt Fernstrom
(74) *Attorney, Agent, or Firm*—Dwayne E. Rogge; Hughes Law Firm, PLLC

(57) ABSTRACT

An apparatus and method for teaching involving teaching manipulatives. The teaching manipulative comprises a longitudinal rod having a plurality of multi-faced objects disposed upon its surface which are capable of substantially sliding along the length of the rod and have a unique object identifier disposed on each face. On either end of the rod is a stop member having a row identifier substantially in alignment with the unique identifiers on the faces of the multi-faced object.

17 Claims, 2 Drawing Sheets

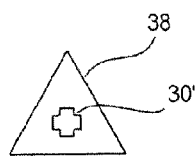 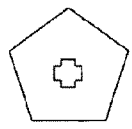 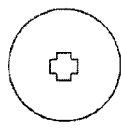 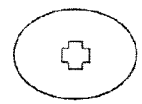 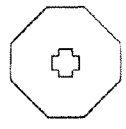
FIG. 4    FIG. 5    FIG. 6    FIG. 7    FIG. 8
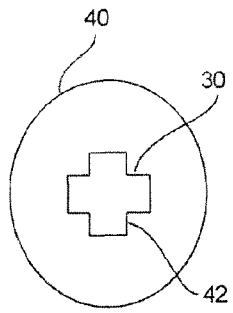 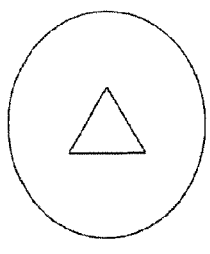 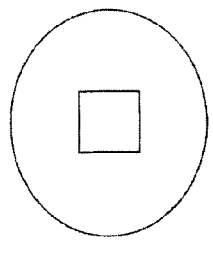 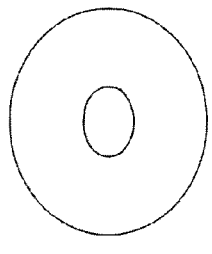 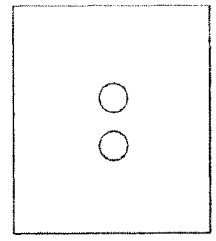
FIG. 9    FIG. 10    FIG. 11    FIG. 12    FIG. 13

MATHEMATICS TEACHING AID

RELATED APPLICATIONS

This application claims priority benefit of U.S. Ser. No. 60/957,953, filed Aug. 24, 2007.

BACKGROUND OF THE DISCLOSURE a) Field of the Disclosure

The invention relates to an apparatus and method for teaching involving mathematical teaching aids and teaching manipulatives.

b) Background Art

Teaching manipulatives and specifically teaching manipulatives to be utilized in teaching elementary school students mathematics are common in the art of teaching. Many of these prior art devices are comprised of a number of very small elements which are easily lost, and for some students very difficult to manipulate. This causes great difficulty with teachers who are not only trying to teach but are also trying to maintain discipline within the classroom and keep a tidy teaching environment. One of the prior art references, U.S. Pat. No. 5,149,269 discloses a rod having individual callers thereon wherein each fifth caller is colored to readily display groups of five elements. Numbers are marked on the rod so that by manipulating the elements from the right most portions to the leftmost portion, a physical representation of arithmetic functions are demonstrated for a student who is following along with the teacher. In the description of the preferred embodiments, a very detailed method for using this apparatus to illustrate addition, multiplication, subtraction, and division is disclosed in the reference.

A great many more mathematical teaching aids have been patented or disclosed. Each has encountered its own level of success, but teachers are still looking for better teaching methods and manipulatives.

SUMMARY OF THE DISCLOSURE

What is disclosed is a teaching manipulative to aid in teaching mathematics to students and a method involving the same. The teaching manipulative comprises a plurality of individual elements, the first element being a rod member (or a plurality of rod members) which, in one form, is a straight element having a cross-sectional configuration which substantially prohibits a plurality of multi-faced objects, which are disposed upon the rod member, from rotating about the rod member. The multi-faced objects are permitted to substantially slide along the length of the rod member between a plurality of stop members disposed on either end of the rod member. Each of the multi-faced objects which is disposed upon the rod member further comprises an object identifier. This may be a number, letter, or other symbol which is disposed upon one or more of the faces of the multi-faced object. For example, the leftmost multi-faced object may have the number 1 disposed upon one or more of its faces, the adjacent multi-faced object to the right may have the number 2 disposed on one or more of its faces etc. These object identifiers may be whole numbers, fractions, decimals, prime numbers and/or symbols. As the multi-faced objects are hindered from substantially rotating about the axis of the rod member, adjacent faces of the multi-faced objects form a row. In one form, the row of adjacent faces forms a series of whole numbers. On each end of the rod member, a stop member is disposed which contains the multi-faced objects upon the rod member. As the multi-faced objects are substantially allowed to slide along the length of the rod member, without the stop members, the rod multi-faced objects could be removed from the rod member which may not be preferred. In one form, a row identifier is disposed upon one or more of the stop members substantially in alignment with a row of faces disposed upon the multi-faced objects.

While a rod member is disclosed being essentially a straight longitudinal element, other orientations are also possible such as curves or angles.

In one form, the unique numeric row identifier which is disposed upon the stop member is coded in combination with the unique object identifier disposed upon the associated row of faces of the multi-faced objects to define the system of multiples. For example, where the row is a row of sequential numbering of whole numbers, and the row identifier is a 2, each of the unique object identifiers disposed upon associated row of faces of the multi-faced object being a multiple of 2 could be coded. As a more specific example, if the 2s row identifier is disposed upon a blue background, all those unique object identifiers in alignment with this row identifier which are also a multiple of 2 could also have a blue background.

As it is often requested that especially for larger classes, a teacher may be able to display a virtual apparatus upon a visual display. It may be desirable to create a computer algorithm which permits digital display of this same apparatus. It may also be desirable to project an image of an actual apparatus upon a visual display to be more easily seen by students.

A method for using the previously mentioned apparatus for teaching mathematics is further disclosed. In this effort, the students would be instructed first of all in how to properly orient the apparatus such that it can be manipulated. This may involve simply lying it in front of them on a desk with a particular end to the left and right such that they can follow along with the teacher's instructions. The teacher would of course wish to constantly observe the students to ensure that they are following along with the instruction and not getting lost in the course of learning. The teacher may also desire to provide feedback to the students to encourage them in success. In this effort especially in a large class it may be desirable to maintain the student's attention by asking them for example which row identifier is in a preferred location. This may be in a four-sided embodiment, where the preferred row identifier is in the topmost position.

One method for teaching mathematics using the apparatus as above involves teaching multiplication. For example a teacher could ask the students to position the apparatus correctly on their desk. The teacher could then instruct the students to either position the apparatus such that a particular row identifier is in the preferred orientation or alternately could ask students to identify the row identifier which is already in the preferred orientation. Whichever method is used, the teacher could then instruct the students to identify along each row, in the preferred orientation, those object identifiers which are a multiple of the row identifier. For example to continue the example previously discussed wherein the 2s row identifier is in the preferred orientation, the students could identify the whole numbers "2, 4, 6, 8 . . . " etc.

Another method for teaching mathematics using the apparatus as previously discussed could include the steps of asking the students to position all of the multi-faced objects to a first end. This first end could be the end most possible to the object that identifier having the largest unique identifier. In other words, if the object identifiers are the whole numbers from one to twenty, a student would be instructed to move all of the multi-faced objects to the end closest to the twenty. Assuming this is the rightmost position on the rod, the students could then be asked to move a first group of the multi-faced objects to the second and/or left of the longitudinal rod. The students could then be instructed to position a second group of the multi-faced objects to the left portion wherein they would be adjacent to the first group of the multi-faced objects. The students could then be instructed to identify the multi-faced object having the highest unique numerical identifier which had been moved from the first end to the second end of the longitudinal rod. To utilize a specific example, the students could move all of the objects to the rightmost position and then be asked to move three multi-faced objects leftward, and then a second group of four multi-faced objects leftward. This would leave in one form the multi-faced object with a seven disposed on its face as the last multi-faced object to have been moved. In such a way students could understand that three plus four equals seven. Many other methods for utilizing the apparatus can be conceived.

BRIEF DESCRIPTION OF THE DRAWINGS

FIG. 4 is a cross sectional view of an embodiment of the disclosure in one form showing one multifaced object having a triangular outer perimeter;

FIG. 5 is a cross sectional view of an embodiment of the disclosure in one form showing one multifaced object having a pentagonal outer perimeter;

FIG. 6 is a cross sectional view of an embodiment of the disclosure in one form showing one multifaced object having a circular outer perimeter;

FIG. 7 is a cross sectional view of an embodiment of the disclosure in one form showing one multifaced object having an oval outer perimeter;

FIG. 8 is a cross sectional view of an embodiment of the disclosure in one form showing one multifaced object having a octagonal outer perimeter;

FIG. 9 is a cross sectional view embodiment of the disclosure in one form showing the longitudinal rod having a cross-shaped surface configuration;

FIG. 10 is a cross sectional view embodiment of the disclosure in one form showing the longitudinal rod having a triangle-shaped surface configuration;

FIG. 11 is a cross sectional view embodiment of the disclosure in one form showing the longitudinal rod having a square-shaped surface configuration;

FIG. 12 is a cross sectional view embodiment of the disclosure in one form showing the longitudinal rod having an oval-shaped surface configuration; and FIG. 13 is a cross sectional view embodiment of the disclosure in one form showing the longitudinal rod comprising a plurality of cylindrical rods.

DESCRIPTION OF THE PREFERRED EMBODIMENTS

Figure 1:
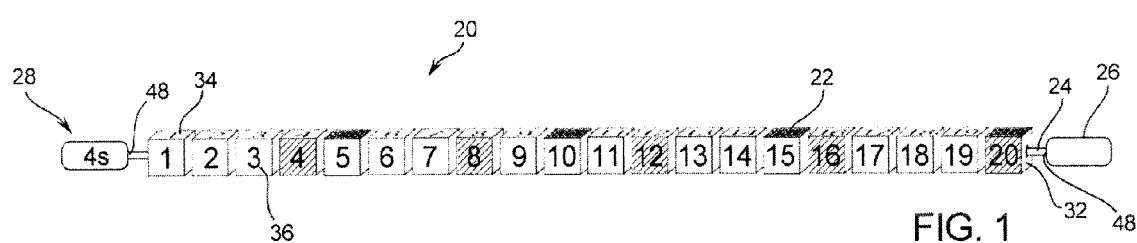
FIG. 1 is a side view of an embodiment of the disclosure in one form showing the row corresponding to the 4s row identifier.

While a wide variety of mathematical teaching manipulatives have been disclosed in the art, they fail to provide a simple apparatus for teaching counting, common multiples, prime numbers, addition and subtraction, greater than and less than, word problems, multiplication, division and remainders. Therefore an apparatus which teaches these abstracts and more is disclosed. The apparatus of this is also very simple to utilize by students and is especially beneficial in teaching students in elementary and middle school. The apparatus of this disclosure in one form is also very easy to store, and is easy to disperse among students prior to utilizing the apparatus, as it is self-contained, and does not require a variety of individual, separable elements, nor does it require any specific mounting. Furthermore, the apparatus can be configured having a very small cross-section wherein a large number of the apparatus can be stored together and take up very little space, which is often at a premium in any teacher's classroom.

Disclosed is a mathematical teaching aid comprising in one form, a plurality of multifaced objects 22 disposed on a rod member 24 having a plurality of stop members 26 and 28 disposed on either end 48 of the rod 24. Each of the multi-faced objects 22 has a surface defining a void 30 disposed between a first and a second longitudinal face 32. Each of the multi-faced objects 22 also has a plurality of radially outward faces 34. Each of the radially outward faces 34 has an object identifier 36. For example, the leftmost multi-faced object disposed on the rod 24 in one form would have the numeral 1 disposed on each of the radially outward faces 34, and the adjacent multi-faced object 22 could have the numeral 2 disposed on each of the radially outward faces 34.

Figure 3:
FIG. 3 is a side view of an embodiment of the disclosure in one form showing the row corresponding to the 3s row identifier.

Taken in cross-section, the multi-faced objects 22 may have an outer perimeter 38 defining a radially outward surface 40. This outer perimeter 38 may, in cross section, form a triangle 38A (FIG. 4), square 38F (FIG. 3), pentagon 38B (FIG. 5), circle 38C (FIG. 6), sphere, oval 38D (FIG. 7), octagon 38E (FIG. 8), or nearly any other geometric shape. An object identifier 36 could be disposed on each surface of the radially outward face 40. For example, in the embodiment of FIG. 4, where the multifaced object 22 is in the leftmost position, the three radially outward faces 34 of the multi-faced object 22 could have the numeral 1 disposed thereon. In the figures, only two of the four sides can be seen in the six-sided embodiment shown.

It may also be preferable to include the Braille representation of the object identifier 36 upon the radially outward surface 34 of each multifaced object 22.

Whole numbers are not the only possible row identifiers, or object identifiers. The identifiers may also be decimal numbers, fractions, symbols, or negative numbers. For example, Kanji symbols could be used in combination with a lesson on Japanese numbers or language.

The rod 24 taken in cross-section may have an outer surface configuration 42, as shown in FIGS. 9-13, being one of any number of a selection of geometric two-dimensional shapes. For example, as shown there is a cross (FIG. 9), triangle (FIG. 10), square (FIG. 11), oval (FIG. 12), plurality of circles (FIG. 13), or other geometric shapes. It may be desirable that the rod surface configuration 42 is configured to inter-operate with the surface defining a void 30 such that the multi-faced objects 22 are prohibited from substantially rotating about the rod 24 but are permitted to slide longitudinally along the rod 24. For example, as shown in FIG. 4, the surface defining a void 30 has a cross-shaped cross-section, and the rod outer surface configuration 42 as shown in FIG. 9 also has a cross-shaped cross-section. Provided that the relative dimensions of each are properly configured, the multi-faced object will be prohibited from rotating about the rod 24 but is positionable along its length.

The stop members 26 and 28 disposed on either end of the rod 24 maintain the plurality of multi-faced objects 22 in one general location. This is very beneficial to teachers attempting to instruct students in mathematics, in that prior art examples oftentimes comprised very small parts which were easily lost, misplaced, or removed from the classroom. The current embodiment of the disclosure keeps the relatively small multi-faced objects 22 localized to the rod 24 by way of the stop members 26 and 28. In another form, the rod itself may be configured to provide a stop member, such as looping rod back upon itself to form a loop, or enlarging a portion to substantially contain the multifaced objects. While in this configuration the multi-faced objects 22 can be slideably positioned along the longitudinal length of the rod 24 to aid in instruction. Current research by educational scholars shows that children learn much more quickly when provided with a wide variety of teaching methods. Of particular interest are Michael Gurian's works indicating that boys need to come into physical contact with objects to fully understand the principles involved. In other words, boys need to get their hands dirty.

Figure 2:
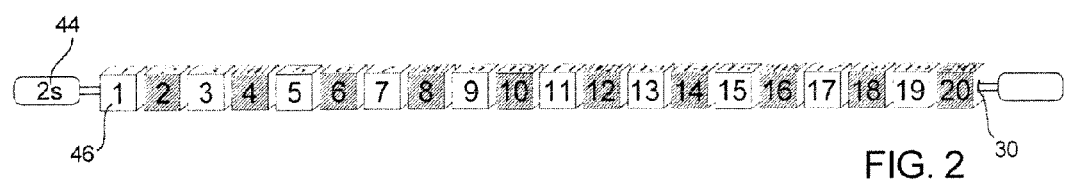
FIG. 2 is a side view of an embodiment of the disclosure in one form showing the row corresponding to the 2s row identifier.

A row identifier 44 may be disposed on one or both of the stop members 26. This row identifier 44 is substantially aligned with a row 46 comprising a plurality of adjacent faces 40 of the multifaced objects 22 forming a numerical series of multifaced objects 22. The individual sides of the multifaced objects 22 may be color-coded to aid in understanding of multiplication; for example, as shown in FIG. 1, the row identifier 28 is "4s" denoting all the multiples of the numeral 4. Thus it can be seen along the row 46, each of those object identifiers 36 being a multiple of four are identically coded. This is the easiest to understand while looking at FIG. 2. It may also be desirable to have the row identifier similarly coded. In one specific example the "2s" row identifier may be printed with a blue background, and each of the object identifiers 36 which are a multiple of 2 (2, 4, 6, 8, etc.) along this row 46 would have a blue background. As the multiples of 2 are also multiples of 4, it may be desirable to dispose the 2s and 4s rows on non-adjacent faces.

As the row identifier and object identifier 36 are disposed upon the multifaced object and not upon the rod, the abrasion and associated wear of the multifaced object against the rod will not in any way reduce the effectiveness of this apparatus. Some prior art examples have the markings upon the rod portion and the bead elements are not marked. The embodiment of the disclosure in one form having the markings indicia on the multi-faced objects allows a completely different use of the apparatus from prior art examples as well as increasing its long-term effectiveness.

This could also be beneficial to teaching the multiples of a plurality of numbers. For example, when positioned in such a way that the rows 46 corresponding to the row identifiers "2s" and "5s" can be seen simultaneously, it is easily understood that the numbers "10" and "20" are both multiples of two and five. By recognizing that the radially outward faces 34 of the multi-faced objects 22 of the $10^{th}$ and $20^{th}$ multifaced objects 22 are coded.

In one form, each of the stop members 28 and 26 may be identically marked. It may alternatively be advantageous for the disclosure in one form to have row identifiers disposed on one of the stop members, allowing the other stop member to be utilized for other text, such as instructions, or marketing information. For example, web sites, phone numbers, or instructions may be disposed upon one of the stop members 26 or 28.

In use, a teacher may desire specific orientation of the apparatus 20 upon a student's desk such that a desired row identifier 44, and the associated row 46 are visible to the student, or in some forms on the uppermost surface, being that surface furthest away from the student's desk. It may also be desirable for the student to position the device in other locations, or alternatively to have the teacher position the device while a student manipulates the objects 22.

While a physical object has been previously discussed in this disclosure, it is also within the bounds of this disclosure to provide the same apparatus as a virtual instrument, projected on a computer screen, wall or by any other video, electronic or other means. This may be to replace the physical apparatus as handled by the students, or alternatively may be a simulation to expand upon the teacher's ability to teach these mathematic applications while the students use either alternate simulations, or the physical apparatus previously discussed.

What follows is a guide for teaching counting, multiples, addition, subtraction, greater than and less than, multiplication, division, remainders, common multiples, and prime numbers. Each of the example methods is taught using the disclosure. In one form, the method for teaching includes many starter questions, sample word problems, and open-ended questions.

Counting

Kids as young as two years of age enjoy counting with the disclosure in one form by pointing at the numbers and sliding the cubes as they count. Once basic counting is mastered, a teacher or parent may utilize the disclosure by turning the disclosure in one form to the 2s side and show counting the twos reciting "2, 4, 6, . . . " as the teacher indicates and/or slides the numbers. The teacher or parent could request the student to count by twos and demonstrate the skill on the disclosure in one form. The teacher or parent could then demonstrate counting by threes using the 3s side, counting by fours using the 4s side, and counting by fives using the 5s side, etc.

Addition and Subtraction

Addition and subtraction can be taught using any side of the disclosure in one form. To teach four plus three, start with four cubes to the far left of the disclosure. Then slowly slide three more cubes over to the left saying "Add three 1, 2, 3 and we get seven. Four plus three is seven!"

To teach thirteen minus five start with thirteen cubes to the far left of the disclosure. Ask "What happens if we take five away from thirteen?" Move five cubes back to the right counting them "1, 2, 3, 4, 5 and the answer is eight. Thirteen take away five is eight!"

The apparatus 20 can also be utilized to teach the mathematical abstract of greater than or less than. This sense of where numbers lie on a number line is a crucial basic skill for any student. Using the apparatus 20 students can see where numbers lie on the number line with the disclosure in one form. For example, a student could be asked "Which numbers are greater than fifteen?" The student would be able to move the leftmost fifteen objects leftward, which would reveal the numbers 16, 17, 18 . . . to the right of fifteen. The student could then identify these numbers as being greater than 15. In another example the student could be asked "How many numbers are smaller than, or less than nine?" The student could move the multifaced objects 22 from the nine rightward which would identify the numbers 8, 7, 6 . . . as being those numbers less than nine. In one other example a student could be asked a question "Which is bigger, 17 or 19?" Upon viewing the number line, the student would recognize that as the number 17 is leftward of the number 19, the student could recognize very easily that the number 19 is greater than 17. As one final example in teaching multiplication, a student could be asked "When we are counting by 5s, we count 5, 10, 15. What would the next number be?" The student could look at the number line and be able to identify very readily by looking at the row identifier 5s that the next number would be twenty.

Word problems could also be introduced to students using the disclosure in one form. As many students do not enjoy working through word problems, the apparatus 20 in one form aids students in their understanding of word problems and therefore increases their likelihood that they will understand and be able to solve these problems on their own. The disclosure gives students a way to organize their thoughts as they progress through the problem. Children are tactile and visual learners. They learn and understand better with manipulatives similar to disclosure in one form.

Several example word problems will now be discussed which should explain in much greater detail how to use the apparatus 20 to aid students in understanding word problems. One example would be asking the question "My friend Ayden has three cats and two dogs, how many pets does he have?" The student can very easily begin with the apparatus 20 having all of the multi-faced objects 22 move to the right most position. Then by moving three multi-faced objects leftward representing the three cats, and then two multi-faced objects 22 leftward representing the two dogs, the student would very easily recognize that Ayden has five pets. In another example the question could be asked "Isabella has two cats, one dog, and five hamsters. How many pets does she have?" By simply manipulating two multi-faced objects 22 leftward this would represent the two cats, one multi-faced object 22 representing the one dog, and five multi-faced objects 22 representing the hamsters, it would be obvious to the student that Isabella has eight pets. To continue this discourse, another question could be asked along the lines of "Mom bought eight bananas and we already have eaten six. How many are left?" The student could readily move eight of the multi-faced objects leftward representing the initial eight bananas, and then move six of the multi-faced objects 22 rightward representing the six bananas that have been eaten which will leave two multi-faced objects on the leftmost portion of the apparatus 20 representing the two bananas which are left. One final example would be "You need ten quarters to buy a gift for your friend. You have seven quarters. How many more do you need to buy the gift?" The student would begin with all the multi-faced objects 22 in the right most position and then would position ten multi-faced objects 22 to the leftmost position representing the ten quarters which are needed. The student would then move seven multi-faced objects 22 to the right most position representing the seven quarters already obtained, leaving the three quarters representing the number the student still needs to buy the gift for their friend.

Multiplication is another mathematical abstract which can easily be taught or more easily be taught by use of the apparatus 20. Students often have an initial difficulty understanding the concept of multiplication and any method or device which aids in this will assist student's understanding. Once again using a small series of specific examples it can be understood how this could be accomplished in a classroom or home environment. For example, to teach a student to multiply five times three, rotate the apparatus 20 until the row identifier 28 representing the 5s series is in a preferred position. Ask the question "How many are in three groups of fives?" The student would position all of the multi-faced objects 22 to the right most position and then would easily be able to recognize the groups of five being those in a preferred position which are coded perhaps by a colored background. By moving three groups of these objects, it can be seen that the rightmost block which was positioned contains the object identifier fifteen. Thus a student can very easily identify that three groups of five is fifteen; in other words, three times five equals fifteen. In another example, a student can be taught how to multiply three times four by rotating to the 3s side and showing four individual groupings of threes. This would result in the twelve being identified. Furthermore a student could be asked to reposition the apparatus 20 so that the row identifier 44 representing the 4s group is in a preferred position thus showing that three groups of four also equals 12. The question could then be asked "Why do both ways give us twelve, three times four and four times three?" The answer is, of course, that three times four and four times three are the same.

Inasmuch as students have difficulty understanding multiplication initially, if they do not grasp multiplication once they get to division it is exponentially more difficult to teach these methods. The apparatus 20 in one form can also be used to further a student's understanding of the mathematical abstract of division and remainders. In one example, a student could be taught how to divide twelve by three by rotating the apparatus 20 to place the row identifier 44 representing the 3s side into preferred location and moving all of the multi-faced objects 22 to the right most position and then repositioning the first twelve multi-faced objects 22 to the leftmost position. The student could be asked to separate the twelve blocks into three equal groups. The student would readily identify that there are four blocks in each group. Alternatively, the student could be asked how many of the blocks are properly coded in the 3s row upon which it would be obvious to the student that four of the multifaced objects 22 are coded. Thus the answer to the initial question would be twelve divided by three equals four. To utilize another example, "What happens if we try to put thirteen into three equal groups?" The student would follow the same process as in the earlier example moving thirteen blocks to the leftmost position wherein it becomes obvious to the student that there are four colored or coded multi-faced objects in the preferred 3s row with one block to the right of the last coded block. This gives the student a graphical representation that thirteen divided by three leaves us with four groups and one leftover. Thus thirteen divided by three is four with one remainder.

To complete the instruction on multiplication, division, and remainders, the disclosure in one form can be utilized to assist students to solve word problems used involving multiplication and division. For example, here are some sample questions. "Popsicles come in packages of two. There are eight packages of popsicles in your freezer, how many popsicles do you have?" The student could be instructed to move all of the multi-faced objects 22 to the rightmost position, and then rotate the apparatus 20 so that the 2s row identifiers are in a preferred location. The student could then move eight of the coded multi-faced objects to the leftmost position revealing that eight packages of popsicles wherein each package consists of two popsicies results in sixteen popsicles in your freezer. As another example, "Bill, Bob, and Ben are brothers. They have to share everything. There are six cookies, can they share them equally?"

Each of the mathematical multi-faced objects 22 in the rightmost position and then move six multi-faced objects 22 to the leftmost position representing the six cookies. Then by rotating the apparatus 20 so that the 3s row was in the preferred position would be obvious to the student that Bill, Bob, and Ben can share the cookies equally in that there are two coded multifaced objects 22 representing that the three brothers can each get two cookies with no cookies remaining. Furthermore, once this is establish the student can be asked "How many cookies would there need to be for each to get three cookies?" The students could then move a total of three coded multifaced objects 22 to the leftmost position revealing that three groups of three cookies each would mean that there would need to be nine cookies. This is represented in that the multifaced object 22 with the object identifier nine would be the last coded multifaced object 22 that would have been moved. One final example in this area could be "Sam likes to play with toy cars. Each toy car can hold four dolls. How many dolls can two cars hold?" The student could be instructed to move all the multi-faced objects 22 to the rightmost position, rotate the apparatus 20 so that the row identifier 44 representing the 4s row would be in a preferred location and then move two coded multifaced objects 22 to the leftmost position. This would then show the student that having two cars each holding four dolls would mean that you could carry eight dolls at one time. By having a third coded multifaced object to the leftmost position it could be seen very readily that three cars each holding four dolls would represent twelve total dolls. Furthermore, a question such as, "Sam has seventeen dolls. How many toy cars would it take to hold all the dolls?" By moving seventeen multifaced objects 22 to the leftmost position still maintaining the 4s row in a preferred orientation, it would readily be apparent that four cars representing the four coded multifaced objects shown would hold sixteen cars. Therefore a fifth car would be needed to hold the seventeenth doll which would be the remainder after the first four cars were full.

One additional mathematical abstract which is facilitated by the apparatus in one form is the teaching of common multiples. The disclosure in one form is well designed to show number patterns such as these. The disclosure will help students to better understand multiples, and the many relationships and patterns and numbers. Several sample questions can be used and built upon to guide students toward discovering number patterns revealed by the disclosure in one form. For example, the question could be asked "Can you find a number that is colored blue on the 2s side and colored green on the 3s side?" In an embodiment where the row identifier on the 2s side is blue, and the row identifier on the 3s side is green, each of the multiples of two along the 2s row would be blue, and each of the multiples of three on the 3s side would be coded green. Thus by looking at the apparatus 20 on a basis such that the 2s and 3s sides represented by the row identifiers 2s and 3s could be viewed simultaneously, it is easily seen that six and twelve are both multiples of two and three. This can be seen in FIG. 3. The follow-up question would be: "Why is that number colored blue and green?" This would direct the student to understand that six and twelve are both multiples of two and three. Additional follow-up questions could include "What patterns do you see with the blue and green numbers?" An embodiment of disclosure wherein the coding for the 5s row is yellow, the question could be asked "Can you find a number that is colored blue on a 2s side and yellow on the 5s side?" The student could view the apparatus 20 with the 2s in 5s rows in a preferred position such that they could be viewed simultaneously wherein the student would readily identify the numbers ten and twenty as colored on both the and 5s rows. This would readily identify each of these numbers as multiples of two and five. Follow-up questions could include "How many numbers are like that?" Or "What do you notice about those numbers?" This would open up a discussion into the multiples of two and five. More advanced questions could include "Can you find a number that is colored blue on the 2s side?" or "Can you find a number that is colored on three sides?" By rotating the apparatus 20 until a multifaced object 22 is revealed showing three colored or coded sides, it can be seen, for example, that the number twelve would be coded on the 2s, 3s, and 4s sides. The follow-up question could then be asked "What do you think that means?" After further investigation the student could be led to understand that twelve is a multiple of two, three and four.

The disclosure in one form is also very useful for the understanding of prime numbers. Understanding prime numbers is often very difficult for students, especially younger children. The prime numbers, for example, between one and twenty are two, three, five, seven, eleven, thirteen, seventeen and nineteen. The disclosure in one form wherein the multifaced objects 22 are numbered between one and twenty displays that seven, eleven, thirteen, seventeen and nineteen are prime numbers. As one example a student can be asked "Can you find a number that is all white?" The student could after inspection of the apparatus recognize that the prime numbers listed above are not coded on any side. The follow-up question could then be asked "Why is that number not colored (coded)?" This could lead to a discussion of prime numbers with the student now having in their hands a manipulative and graphic representation aiding in their understanding. There are follow-up questions such as, "Would the number twenty-one be a prime number?" or "What about twenty-two or twenty-three?"

There are a great many additional questions and methods that could be utilized in conjunction with the apparatus 20. For example, a student can be asked "Show me how to count by 4s." The student could position the 4s row in a preferred embodiment and very quickly and readily identify those multi-faced objects 22 which are coded. These being four, eight, twelve, sixteen, etc. Another sample question is "Show me three groups of five." The student could rotate to either the 3s or 5s row and easily position the multi-faced objects 22 along the rod 24 giving a manipulative and graphical representation of the answer fifteen. Further questions could include "Show me eight blocks put into four groups of four." Or, "teach me seven plus eight", "teach me eighteen minus three minus four", "tell me about any patterns you see". Each of these questions could easily lead to a discussion of specific mathematic abstracts.

Show me fifteen divided by four. Why does it not work evenly? What numbers would evenly divide by four?

A mathematics teaching system is disclosed in one form comprising: a plurality of multifaced objects, a rod, and a plurality of stop members. Each of the multi-faced objects may comprise, a plurality of radially outward faces, a plurality of longitudinal faces, and a surface defining a void which extends from one longitudinal face to the opposing longitudinal face. Each multi-faced object may have the same number disposed on each of the radially outward faces.

The rod of one form comprises a plurality of longitudinal ends, and is configured to interoperate with the multi-faced objects. The rod has a surface configuration configured to slidingly interoperate with the surface defining a void of the multi-faced objects The stop members may be disposed on either longitudinal end of the longitudinal rod. While a longitudinal rod having ends is discussed, the rod may be a circle or other configuration and still operate as desired. As younger children especially enjoy moving objects along helical or other shaped rods or wires, these configurations may be just as effective, of not more so.

Further disclosed is a mathematic teaching system where the multi-faced objects of one form are configured to interoperate with the longitudinal rod in such a way as to be capable of sliding along the longitudinal axis of the longitudinal row. The objects are hindered from rotating substantially about the axis of the longitudinal rod by the configuration of the rod surface configuration in combination with the surface defining a void of the multi-faced object.

In one form, the adjacent faces of the multi-faced objects form a row of sequential numbering.

The mathematics teaching system of one form may include stop members having a plurality of unique numeric row identifiers disposed thereon. The row identifiers may be substantially in alignment with the row of sequential numbering.

In one form, the unique numeric row identifiers are coded in combination with the unique numeric row identifier disposed upon the associated row of sequential numbering to define a system of multiples.

The system of multiples of one embodiment of the disclosure comprises a color coding system. The color coding system of one form may define a system of multiples of 2s such that the unique number disposed upon the stop member is the numeral two coded with a first color, and each of the associated numeric identifiers which are a multiple of two along the row adjacent the numeral two row identifier are also coded with the first color.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

I claim:

1. A teaching manipulative comprising:
   a) a rod member,
   b) a plurality of stop members disposed on the rod member,
   c) a plurality of multifaced objects movably disposed on the rod member between the stop members,
   d) a plurality of unique row identifiers substantially in alignment with a row of the faces of the multifaced object,
   e) wherein the multi-faced objects are configured to be positioned along at least a portion of the rod member, and are hindered from rotating substantially about the rod member, and
   f) wherein each of the multifaced objects comprises an object identifier unique to each multifaced object which is disposed on the multifaced objects.

2. The teaching manipulative of claim 1 wherein the object identifier unique to each multifaced object is disposed on each face of the multifaced objects.

3. The teaching manipulative of claim 1 wherein the plurality of unique row identifiers is disposed upon at least one of the stop members.

4. The teaching manipulative of claim 1 wherein the rod member is substantially straight.

5. The teaching manipulative of claim 4 wherein the rod member comprises a plurality of rods substantially parallel to each other.

6. The teaching manipulative of claim 1 wherein adjacent object identifiers of the multi-faced objects disposed on the rod form a row of sequential numbering.

7. The teaching manipulative of claim 6 wherein the row of sequential numbering comprises a series of whole numbers.

8. The teaching manipulative of claim 1 wherein the object identifiers are selected from the group consisting of: whole numbers, fractions, decimals, prime numbers, and symbols.

9. The teaching manipulative of claim 1 wherein the multifaced objects are substantially cubes having six equal square faces with the object identifier disposed on four sides.

10. The teaching manipulative of claim 1 wherein the unique row identifiers are coded in combination with the unique object identifier disposed upon the associated row of sequential numbering to define a system of multiples.

11. The teaching manipulative of claim 10 wherein the system of multiples comprises a color unique to each row.

12. The teaching manipulative of claim 11 wherein the color coding comprises a system of multiples of twos such that the unique row identifier is the numeral two coded with a first color, and each of the associated numeric identifiers which are a multiple of two along the row in alignment with the numeral two row identifier are also coded with the first color.

13. The teaching manipulative of claim 1 further comprising a Braille representation of the unique object identifier and the unique row identifier, disposed on the multifaced object.

14. The teaching manipulative of claim 1 further comprising a visual display configured to display a representation of the elements of the teaching manipulative in operation.

15. A method for teaching students mathematics comprising the steps of:
   a) providing a mathematics teaching apparatus comprising a rod, a plurality of stop member disposed on the rod, a plurality of multi-faced objects movably disposed upon the rod between the plurality of stop members,
   b) wherein each of the multifaced objects have a unique numeric identifier,
   c) providing a row identifier for each row of adjacent faces of the multifaced objects,
   d) instructing students in a particular method of positioning the multi-faced objects along the rod,
   e) wherein the students manipulate the multifaced objects as directed;
   f) observing whether the students have properly positioned the multi-faced objects, and
   g) providing students with feedback based upon their success in properly positioning the multifaced objects.

16. The method for teaching mathematics of claim 15 further comprising the steps of:
   a) instructing the students to position the teaching apparatus with a particular row identifier in a preferred orientation,
   b) instructing students to identify the row identifier in the preferred orientation, and
   c) instructing students to identify along each row, those object identifiers which are a multiple of the row identifier.

17. The method for teaching mathematics of claim 15 further comprising the steps of:
   a) identifying a first end of the longitudinal rod as that end most proximal to the multi-faced object having the highest unique numerical identifier,
   b) instructing the students to position the multi-faced objects to a first end of the longitudinal rod,
   c) instructing students to position a first group of the multi-faced objects to a second end of the longitudinal rod;
   d) instructing students to position a second group of the multi-faced objects adjacent to the first group of the multifaced objects, and
   e) instructing students to identify the multi-faced object having the highest unique numerical identifier which has been moved away from the first end of the longitudinal rod.

* * * * *